United States Patent [19]

Oguma

[11] Patent Number: 4,480,504
[45] Date of Patent: Nov. 6, 1984

[54] SYSTEM FOR CONTROLLING TRANSMISSION RATIO OF TRANSMISSION FOR AUTOMOTIVE VEHICLES

[75] Inventor: Tomio Oguma, Anjo, Japan

[73] Assignee: Aisin Seiki Kabushiki Kaisha, Kariya, Japan

[21] Appl. No.: 263,006

[22] Filed: May 12, 1981

[30] Foreign Application Priority Data

May 14, 1980 [JP] Japan ................................. 55-63519

[51] Int. Cl.³ ........................................... B60K 41/04
[52] U.S. Cl. .................................................. 74/868
[58] Field of Search .................. 74/190.5, 687, 865, 74/867, 868

[56] References Cited

U.S. PATENT DOCUMENTS

| | | | |
|---|---|---|---|
| 3,828,618 | 8/1974 | Sharpe et al. | 74/200 |
| 3,913,418 | 10/1975 | Miyao et al. | 74/867 X |
| 3,949,627 | 4/1976 | Murakami | 74/867 |
| 3,958,466 | 5/1976 | Epenschied | 74/867 |
| 4,098,148 | 7/1978 | Wayman | 74/868 X |
| 4,257,441 | 3/1981 | Iwanaga et al. | 74/867 X |
| 4,347,764 | 9/1982 | Lauven | 74/867 |

Primary Examiner—James A. Leppink
Assistant Examiner—Frank H. McKenzie, Jr.
Attorney, Agent, or Firm—Oblon, Fisher, Spivak, McClelland & Maier

[57] ABSTRACT

The transmission ratio of an infinitely variable transmission for automotive vehicles is controlled by a system including a hydraulic servo. The servo mechanism including an actuator which is driven by a line pressure to actuate the transmission and a spool having one end to which a signal pressure responsive to both throttle opening responsive pressure and vehicle speed responsive pressure is applied counteractingly against a spring. The spool provides a control valve function for the driving fluid pressure to the actuator. In response to signal pressure change to the spool the actuator is actuated in such direction that the transmission ratio is decreased or increased. The signal pressure is produced by a compensation valve due to a throttle opening responsive pressure and vehicle speed responsive pressure, e.g. governor pressure.

18 Claims, 10 Drawing Figures

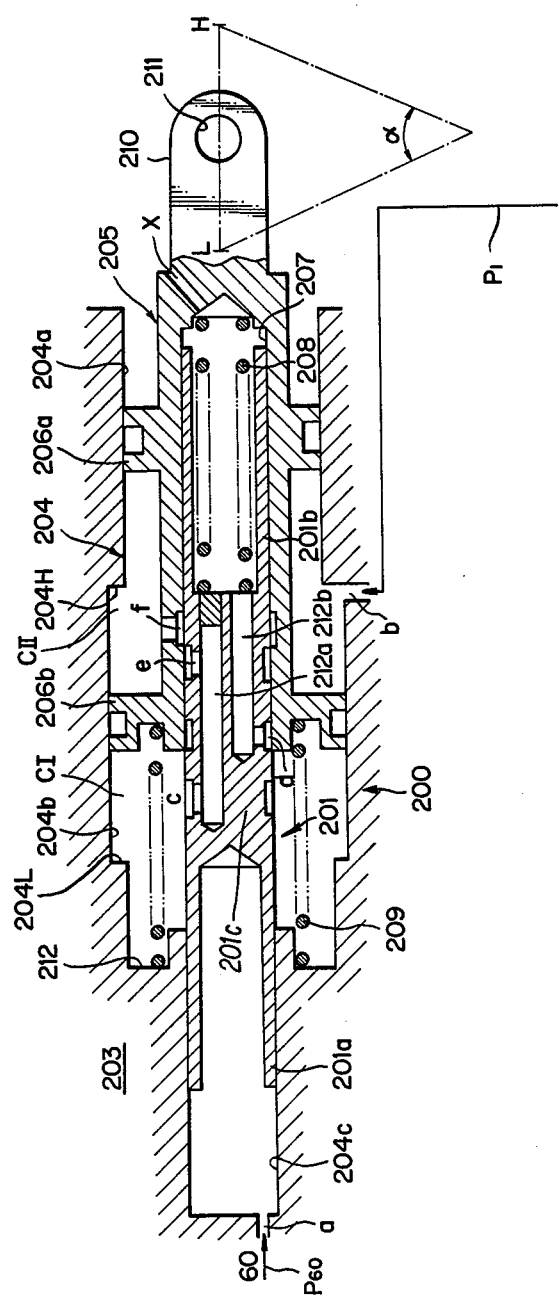

SYSTEM FOR CONTROLLING TRANSMISSION RATIO OF TRANSMISSION FOR AUTOMOTIVE VEHICLES

BACKGROUND OF THE INVENTION

1. Field of the Invention

The present invention relates to a system for controlling the transmission ratio of a transmission, and more particularly to a system for controlling the transmission ratio of a mechanically operated infinitely or steplessly variable transmission for automotive vehicles.

2. Description of the Prior Art

The transmission ratio control of the infinitely variable transmission has heretofore been accomplished by means of a transmission ratio ("ratio" hereinafter) control actuator upon which hydraulic ratio control pressure from a flow rate control valve is applied. The ratio control pressure is produced by a flow rate control valve which is differentially amplified by a force exerted on the displacement of a cam operatively connected with a throttle valve and a counteracting output pressure of a hydraulic governor driven by an output shaft of a transmission. It is very difficult to design such control system as the ratio control actuator is directly driven by the differentially amplified pressure from the flow rate control valve. In other words, it is very difficult to obtain on the one hand a high governor pressure sufficient to drive a spool of the flow control valve, on the other hand to provide a low cam displacement, to precisely determine the spring strength of the flow control valve and to provide a sufficiently long stroke. In addition, a large force to depress an acceleration is required by the long displacement of the cam. It is preferable to obtain a compensation control hydraulic pressure by pressing a pilot piston by means of an additional cam linked with a throttle valve if pressures for compensation such as differential compensation for throttle opening and compensation at starting are additionally applied to the ratio controlling pressure, i.e. actuator driving pressure. Still a greater force is required for depressing the acceleration pedal to provide compensation pressure in such case. Furthermore, the design of flow control valve becomes still more difficult if a well-balanced hydraulic pressure for the control of actuator would be generated by means of only one flow control valve into which a compensation control pressure is also input. Such drawbacks in the prior art make it also difficult to obtain a reliable ratio controlling system covering a wide transmission ratio range.

SUMMARY OF THE INVENTION

Therefor, one object of the present invention is to provide a novel system for the infinite (or stepless) variable transmission ratio control which can deviate from such drawbacks in the prior art aforementioned.

Another object of the present invention is to provide a reliable system for the infinite variable transmission control covering a wide transmission ratio range.

A further object of the present invention is to provide a system for the infinite variable transmission control in which a control signal pressure for actuator may be supplied separately from the driving pressure for the actuator of the transmission ratio controlling system.

Still a further object of the present invention is to provide such a system aforementioned which includes a transmission control servo means provided with a follow-up type actuator being actuatable with an actuator control signal which is obtained in response to both a signal (pressure) responsive to the vehicle speed and a signal (pressure) responsive to the throttle opening.

Yet another object of the present invention is to provide such a system aforementioned which provides an improved differential amplifying compensation valve means.

Yet a further object of the present invention is to provide such a system aforementioned which includes an improved follow-up type servo means for regulating the mechanical transmission ratio change means.

The present invention realizes an infinite or stepless transmission ratio control system over a wide range by providing a transmission ratio control servo means including a follow-up type actuator controlled by an actuator control signal which is obtained in response to both a signal (pressure) responsive to vehicle speed and a signal (pressure) responsive to the throttle opening, while the actuator is driven by a line pressure separately supplied from the servo means (or actuator) control signal. The control signal is supplied by a compensation valve to a controlling valve means arranged in the actuator for follow up control thereof, while the compensation valve receives both a pressure responsive to throttle opening and a pressure responsive to vehicle speed.

In a system for controlling the transmission ratio of an infinitely variable transmission for automotive vehicles including means for producing a line presure, means for producing a pressure responsive to throttle opening, means for producing a pressure responsive to vehicle speed, and means in the infinitely variable transmission for changing the transmission ratio thereof, the improvement according to the present invention conprises a servo means including:

a spring-backed spool to which a hydraulic pressure as an input signal providing a transmission ratio control signal pressure responsive to both the throttle opening and the vehicle speed is applied against the spring force, and an actuator axially slidable in a cylinder, the actuator being operatively connected with the transmission ratio changing means and actuated by the line pressure, provided that the spool provides a control valve means to control the line pressure for actuating the actuator, and causing the actuator to slide toward the increase or decrease of the transmission ratio in response to the input signal to the spring-backed spool.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is an enlarged cross sectional view showing the transmission ratio control servo shown in FIG. 1;

DETAILED DESCRIPTION OF THE PREFERRED EMBODIMENT

Figure 1:
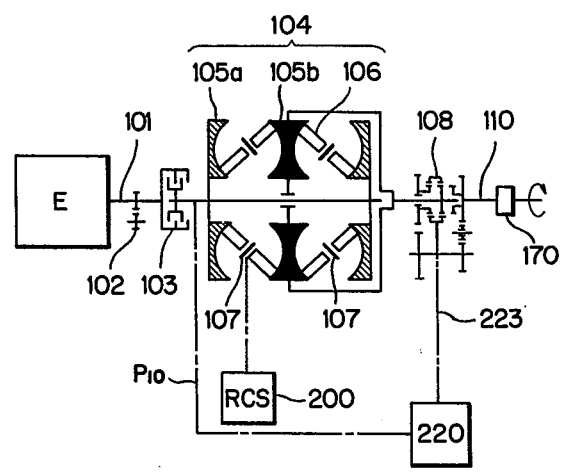
FIG. 1 is a schematic view showing the relation between a transmission and a transmission ratio control system of the present invention.

In FIG. 1, there is shown a gear train including a mechanical infinitely variable transmission 104 which is controlled by transmission ratio control servo (RCS) 200 of the system of the present invention. A main pump 102 which is driven by an engine output shaft 101 of an engine E provides a line pressure source for the transmission ratio control system. Then the engine output shaft 101 is in serial connection with an automatic starting clutch 103, mechanical (spherical surface friction type) transmission 104, and a forward and reverse changing gear 108. A governor valve 170 is connected with an output shaft 110 of the transmission 104 which is, in turn, connected with a final drive unit of a vehicle (not shown). The transmission 104 is of the spherical surface friction type in which a pair of opposing spherical discs 105a and 105b are frictionally coupled through rollers 106 rotatable with respect to an axis 107. The transmission ratio of the transmission 104 may be infinite, i.e., steplessly adjusted by changing the angle between rotation axes 107 of rollers 106 and discs 105a and 105b by actuation of transmission ratio control servo 200. A servo valve 220 governs the directional movement of the vehicle by means of the forward and reverse changing gear 108, being coupled thereto by a folkshaft 223. Valve 220 also controls the engagement/disengagement of the automatic starting clutch 103. The transmission 104 may be of the other types of infinitely variable transmissions such as cone-pulley gear, Graham type transmission, and Evans type transmission etc.

Figure 2A:
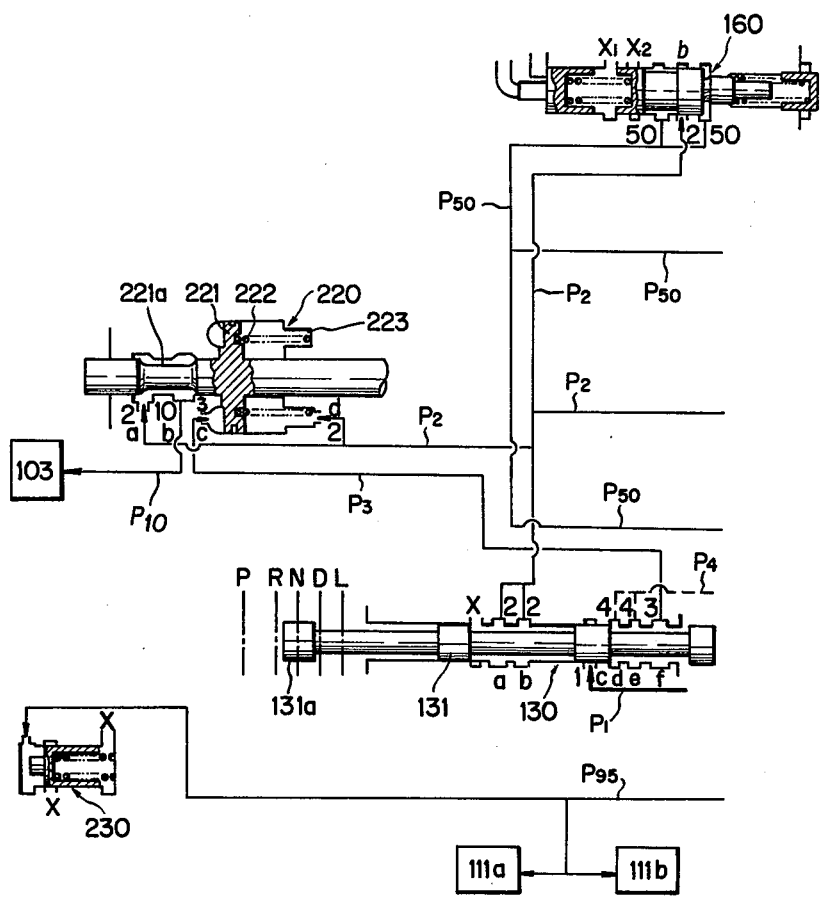
FIGS. 2 (2A,2B) is a hydraulic circuitry diagram of an embodiment of the present invention.

Now referring to FIG. 2, the main pump 102 supplies pressurized fluid functioning as a line pressure medium from an oil pump 109 to a line $P_1$ through a line $P_{99}$ in connection with the rotation of the engine E. The line $P_1$ is, in turn, connected with respective ports (1) of a pressure regulating valve 120, the governor valve 170, transmission ratio control servo (RCS) 200, and a manual select valve 130 for providing line pressure $P_L$ thereto. The main pump 102 may be a well known rotary or gear pump or the like. The discharge rate of the pump 102 is generally proportional to the r.p.m. thereof.

The pressure regulating valve 120 per se may be a known valve, and has spools 121 and 122 which are biased by a spring 123 therebetween. The spools 121 and 122 at opposite sides of the spring 123 provide pistons at ports a and f, respectively. Line $P_1$ is connected to port f through an orifice 124 and an output line $P_{50}$ of a throttle valve 160 is connected to the port a of the valve 120. The orifice 124 is disposed for smoothing pulsed flow from the pump 102 of line $P_1$.

Figure 2B:
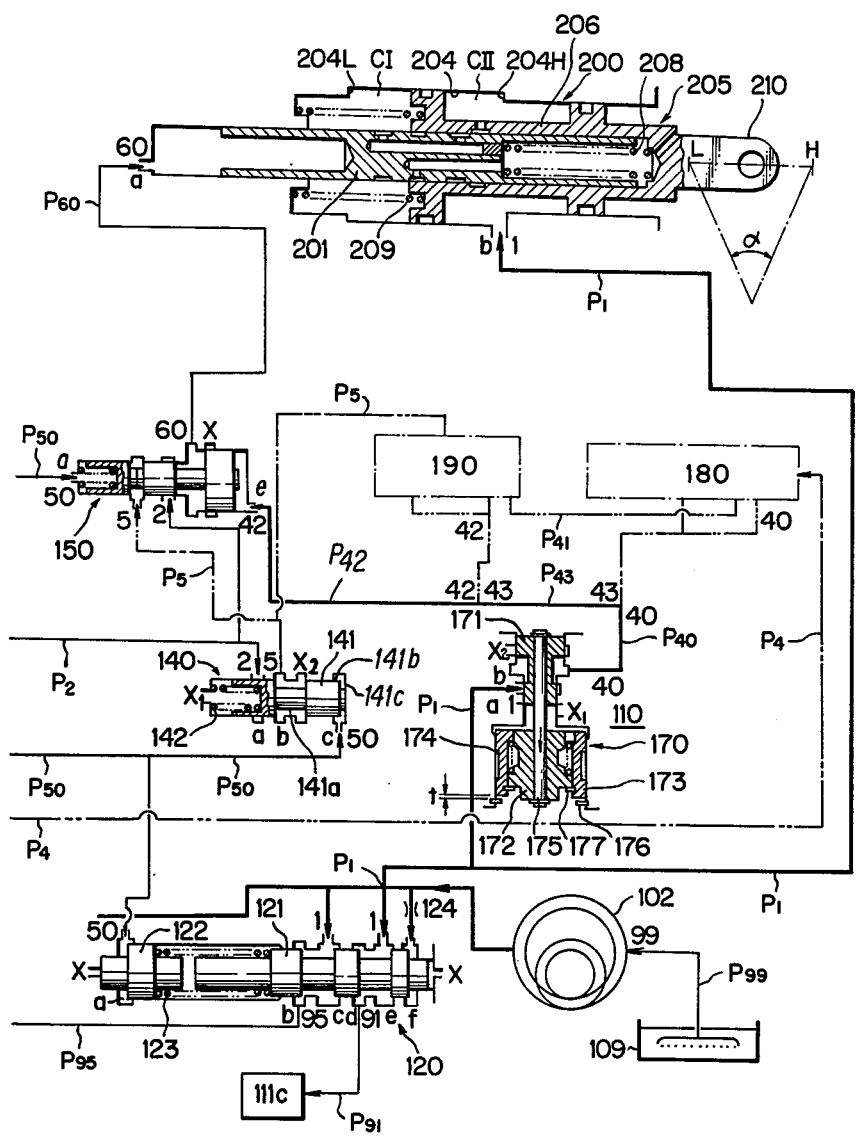

The line $P_1$ is also connected to ports c and e. Lines $P_{95}$ and $P_{91}$ are connected to ports b and d of the valve 120, respectively. The ports c and e are into communication with ports b and d, respectively, when the spool 121 is moved leftwardly, as shown in FIG. 2B. The line $P_{95}$ is connected to a relief valve 230, and is connected to a clutch or other lubricating systems 111a and 111b. The line $P_{91}$ is connected to another lubricating system 111c. There are provided drain ports X at the opposite ends of the pressure regulating valve 120.

The pressure regulating valve 120 is adapted to regulate the line pressure $P_L$. When the discharge rate of main pump 102 and line pressure $P_L$ increase due to an increase in the r.p.m. of the engine, a leftward force is applied to the piston at port f against the spring 123 to urge the spool 121 leftwardly to open the ports b and d. Opening of ports b and d causes the fluid to be released into lines $P_{95}$ and $P_{91}$ so that the line pressure $P_L$ is regulated by being decreased. It is preferable to provide a time lag between the opening of ports b and d, so that the pressure regulation is accomplished by the opening of one port when the increase in line pressure $P_L$ is low, or alternatively the pressure regulation is accomplished by the opening of both ports b and d when the increase in line pressure $P_L$ is high.

The lines $P_{95}$ and $P_{91}$ connected to ports b and d are generally kept at a low pressure less than 1 kg/cm². The line $P_{95}$ is kept at a pressure less than a predetermined value by means of the relief valve 230 which may be a conventional valve.

The line $P_{50}$ is connected to a port a so that a pressure (throttle pressure) $P_{TH}$ corresponding to a throttle opening is applied onto a piston surface of spool 122 from throttle valve 160. When an accelerator pedal is depressed to increase the throttle opening, throttle pressure $P_{TH}$ is increased to urge the spool 122 rightwardly and in turn to urge the spool 121 rightwardly through spring 123 to close the ports b and d of the valve 120. The line pressure $P_L$ tends to increase when the discharge rate of the main pump 102 sequentially increases due to an increase in the engine r.p.m. ($N_E$).

The governor valve 170 per se may be conventional valve as shown in FIG. 2B. The valve 170 is provided on the output shaft 110 of the transmission 104 so that it is related together with the output shaft for establishing a hydraulic pressure responsive to vehicle speed. The body of the governor valve 170 is integral with the output shaft 110 of the transmission 104. The governor valve 170 comprises large and small diameter bore portions. The governor valve 170 has a drain port $X_1$, an input port a, an output port b, and a drain port $X_2$ in order from the center thereof at the small diameter bore portion. The governor valve 170 has at the large diameter bore portion a cylindrical weight 172, having a weight $W_1$, coaxially linked with the spool 171 through a pin 175 normal to the output shaft 110 and a cylindrical weight 173, having a weight $W_2$, which is axially movable along the periphery of the weight 172. The weight 173, having a weight $W_2$ is engaged with the cylindrical weight 172 in an outer radial direction with respect to output shaft 110 through a spring 174. A snap 176 is retained in the large diameter bore portion with a small clearance t from the outer end of the cylindrical weight 173 to prevent the weight 173 from moving in a radial and outer direction with respect to the output shaft 110.

Figure 7:
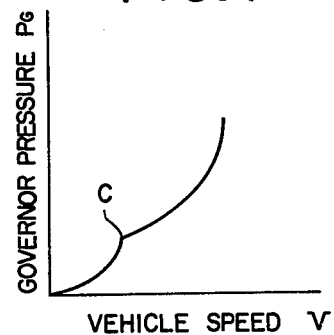
FIG. 7 is a graph showing the relation between the governor pressure $P_G$ (output signal) in governor valve and the vehicle speed.

A centrifugal force on the weights 172,173 is established simultaneously with the rotation of the output shaft 110. The centrifugal force proportional to the r.p.m. of the output shaft or a vehicle speed V is applied upon the pin 175 in a direction as shown by an arrow in FIG. 2. On the other hand, the line pressure $P_L$ is introduced to the port a of valve 170 through line $P_1$ so that the opening of a passage between ports a and b increases in accordance with the increase in the vehicle speed V. Accordingly a governor pressure $P_G$ is generated as an output signal at port b in response to the vehicle speed V as shown in FIG. 7.

The port b of valve 170 is in communication with an inlet port e of a compensation valve 150 via lines $P_{40}$, $P_{43}$, $P_{42}$ for supplying a governor pressure $P_G$ as a signal pressure responsive to the vehicle speed V.

Alternatively, the port b may be connected to an inlet port e of the compensation valve 150 via line $P_{40}$ through a hold valve 180, a line $P_{41}$, a and modulator valve 190 and line $P_{42}$ if desired. In this case, pressure $P_G$ which has been modulated and controlled is applied to the compensation valve 150 as a signal pressure, whereas the line $P_{43}$ is closed in this case.

The weight 173 of the governor 170 is stopped by the weight 172 through the spring 174 when an centrifugal force is slightly applied to the weight 173 in a direction as shown by the arrow. The weight 172 is stopped by a snap 177 so that a centrifugal force proportional to the mass $(W_1+W_2)$ is applied upon the pin 175. When the r.p.m. of the output shaft 110 is further increased, the weight 173 is blocked by the snap 176 so that the centrifugal force is counterbalanced by the output shaft 110. After passing point c in FIG. 7, the weight 172 plus biasing force of the spring 174 act upon the pin 175, and a governor pressure $P_G$ is established as shown by a curve GV in FIG. 7.

The manual select valve 130 comprises a body having a drain port X, ports a–f in order from left to right and a spool 131 with a manually select knob 131a. The spool 131 is shiftable to various positions such as a parking position P, a reverse position R, a neutral position N, a drive position D and a lockup position L. The line $P_1$ is connected with port c of the manual select valve 130. The ports a and b are connected through a line $P_2$ to ports a and d of the servo 220, a port b of throttle valve 160, a port a of a kick-down valve 140, and a port c of compensation valve 150.

In the neutral position N of the valve 130, the port c is closed. Ports a and b are in communication with the drain port X which is open. No pressure is applied to ports d–f. In the drive position D of valve 130, the port c is in communication with ports a and b. The drain port X is closed. No pressure is applied to ports d–f. In the lockup position L, the drain port X, ports a and e are closed, and ports b and d are in communication with the port c, and no pressure is applied to the port f.

In the reverse position R, no pressure is applied to ports a and b which are in communication with the drain port X (open). The port c is in communication with ports d–f for establishing the line pressure $P_L$.

In the parking position P, the port a is in communication with the drain X (open). Ports b and f are closed. The port c is in communication with ports d and e.

Ports d and e of the manual select valve 130 may be connected to a port of hold valve 180 via a line $P_4$ if desired so that additional control of governor pressure $P_G$ (Lockup) may be accomplished. For this provision line $P_4$ is optional. In this embodiment line $P_4$ is closed. Port f of manual select valve 130 is connected to a port c of servo valve 220 via a line $P_3$.

The servo valve 220 comprises a body having ports a to d and a servo piston 221 having one end biased by a spring 222. The servo piston 221 is movable against the spring 222 rightwardly by a hydraulic pressure applied to the port c.

The piston 221 in the left position as shown in FIG. 2 is for forward movement of the vehicle. The piston 221 in the right position is for reverse movement of the vehicle. The piston 221 is integral with a folkshaft 223 of the forward and reverse changing gear 108 or operatively connected with a folk shaft through a link mechanism. The port a is in communication with the port b in the left (forward) position of the piston 221. The port b is connected with an actuator for the automatic clutch 103 via line $P_{10}$ (FIG. 1).

Actuation of the servo valve 220 is controlled by the manual select valve 130. When the shift knob 131a of the manual select valve 130 is in position N, pressure from line $P_3$ is not applied to port c of servo valve 220. The piston 221 is retained at a forward position. Since no pressure is applied to ports a and b of servo valve 220 which are in communication with each other, the starting clutch 103 is in a disengagement position.

When the shift knob 131a of the manual select valve 130 is in position D or L, the piston 221 is in the forward position. In position D, the ports a and b of manual select valve 130 are in communication with the port c. The line pressure $P_L$ is applied to ports a and d of servo valve 220 via the line $P_1$, the manual select valve 130, and line $P_2$. Line pressure $P_L$ is applied to the automatic clutch 103 via ports a–b and a line $P_{10}$ so that the clutch 103 is in engagement position. Line pressure $P_L$ applied to port d additionally acts on a spring 222 to hold the piston 221 at the forward position.

When the knob 131b is in position L, the line communication is identical with that in position D except for the port a of the manual select valve 130 is closed. The flow rate of the fluid from the line $P_1$ to $P_2$ is slightly restricted so that a slightly lower line pressure $P_L$ is supplied to a line $P_{10}$ connected with the clutch 103.

In position R, line pressure $P_L$ is applied to the port c of the servo valve 220, which is in communication with ports c and d of the manual select valve 130 through the line $P_3$. The piston 221 is moved rightwardly to reverse position against the spring 222. At the same time the port c is brought into communication with the line $P_{10}$ by communication of ports b and c through a reduced shoulder 221a so that line pressure $P_L$ is applied to the clutch 103. At this time, no pressure is applied to the port d (at the side of the piston spring) of the servo valve 220 since the line $P_2$ is in communication with drain port X via ports a and b of the manual select valve 130.

Figure 4:
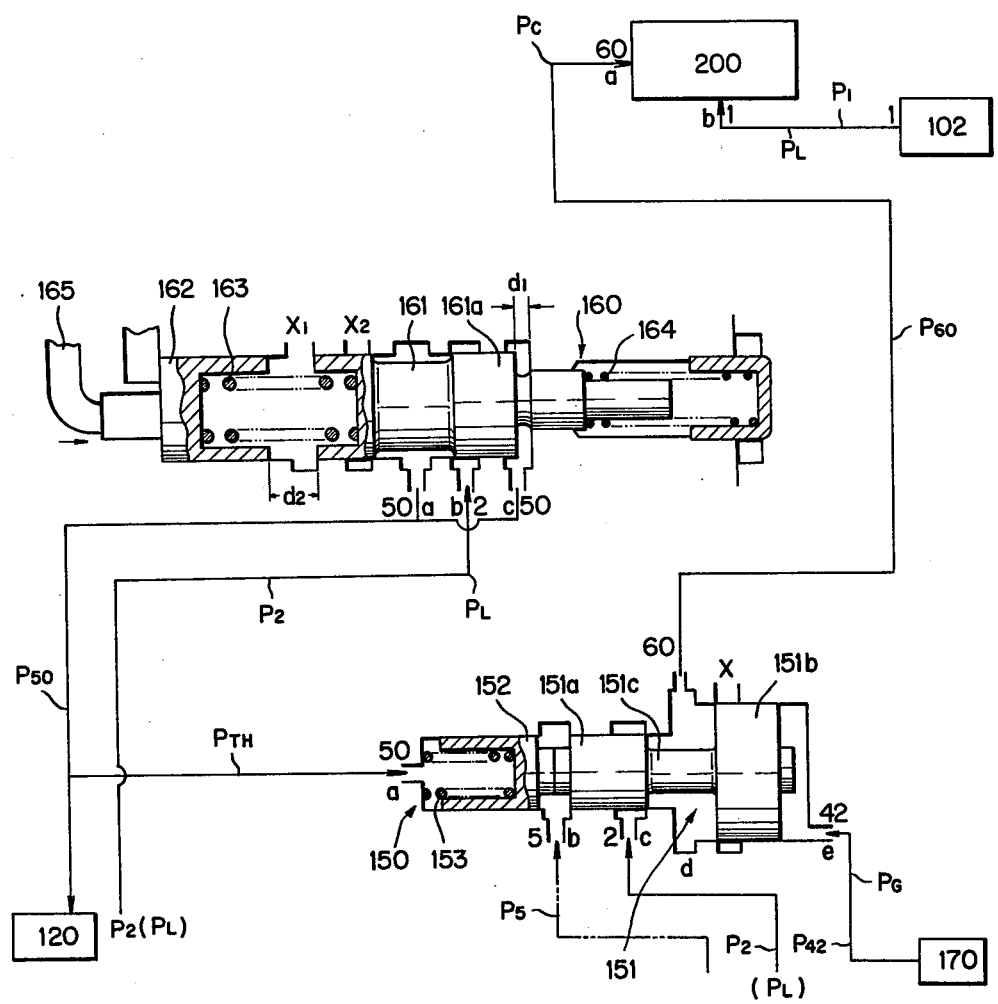
FIG. 4 is an enlarged schematic view showing throttle valve and compensation valve.

The throttle valve 160 per se may be a known valve. The throttle valve 160 comprises a body having drain ports $X_1$ and $X_2$, ports a–c in order and a spool 161, having one end biased by a spring 164 and the other end biased by a spring 163 as shown in FIG. 4 in detail. The spring 163 is disposed between spools 161 and 162 in a compressed manner and is subject to a rightward biasing force proportional to the throttle opening by means of an arm 165 operatively connected with a throttle actuating mechanism (not shown). Drain port $X_1$ is disposed in a spacing $d_2$ between spools 161 and 162. Drain port $X_2$, ports a–c are disposed over an area within which the spool 161 is movable. The spool 161 has a piston portion 161a at the port c.

The port b of the throttle valve 160 is in communication with ports a and b of the manual select valve 130 through the line P₂. On application of line pressure $P_L$ upon the port b of the line P₂, port b and a are in communication through a minimum opening, and the port X₂ is closed. With no line pressure $P_L$ applied to the line P₂, the piston portion 161a is abutted to the end plate of the body. The spacing d₁ is zero.

When the acceleration pedal is depressed, arm 165 urges the spool 162 in a direction shown by an arrow through link means (not shown) and in turn urges the spool 161 rightwardly as shown by an arrow through the spring 163. As a result, the opening of passage between ports a and b increases so that a signal pressure (throttle pressure $P_{TH}$) is established in the port a corresponding to the throttle opening (displacement of the acceleration pedal). The port a communicates with the port c via line P₅₀. A force is thus applied to piston portion 161a in such a direction that it will prevent the increase in throttle pressure $P_{TH}$ each time when the throttle pressure $P_{TH}$ increases. The drain port X₂ is disposed so as to prevent the throttle pressure $P_{TH}$ from changing (increasing) dependently of the line pressure P₂ as well as independently of the throttle opening. When the urging force of the piston portion 161a exceeds the biasing force of the spring 163 responsive to a throttle opening, the port b is rendered into communication with the port X₂ to regulate the throttle pressure $P_{TH}$ responsive to the throttle opening. The port b is in turn in communication with port a of a compensation valve 150, port a of the pressure regulator valve 120 and a port c of the kickdown valve 140 respectively, via the port a of the valve 160 and line P₅₀.

The compensation valve 150 has two spools 151 and 152 within a stepped cylinder having ports a-d, a drain port X, and e thereon. The spool 152 is biased by a spring 153 at the end adjacent to the port a and counteracts against a small diameter piston 151a of the spool 151 at the port b. The spool 151 comprises a small diameter piston 151a, a large diameter piston 151b and a shaft 151c therebetween. The cylinder has the port c at an area within which the small diameter piston 151a is movable, and ports d, drain port X and e along the large diameter piston 151b. The port e opens to a space at the right side of the large diameter piston 151b. The port d is rendered into communication with the drain port X, simultaneously port c rendered into closed relationship with the port d by a rightward movement of the spool 151. Ports c and d are rendered into open position simultaneously for fluid communication therebetween with drain port X (in turn ports X and d) rendered into a closed position by a leftard movement of the spool 151.

The line P₅₀ (from port a of throttle valve 160) is connected to the port a of the compensation valve 150 for supplying the throttle pressure $P_{TH}$. The line P₅ from the port b of the kickdown valve 140 is connected to the port b of the compensation valve 150. The port b of the valve 150 is also connected to a port of the modulator 190 if the modulator 190 is added. The line P₂ from ports a and b of the manual select valve 130 is connected with the port c of compensation valve 150. Line P₄₂ having a signal source in the governor valve 170 is connected to the port e of the compensation valve 150. A line P₆₀ is connected to the port a of the transmission ratio control servo (RCS) 200 for supplying an output signal pressure from port d of the compensation valve 150. In addition, the line P₄₂ is directly connected to the output line P₄₀ of the governor valve 170 through the line P₄₃. The line P₄₃ is closed if the hold valve 180 and the modulator valve 190 are optionally added.

At the port b of the compensation valve 150 the shaft of spool 152 is abutted to that of the small diameter piston 151a of spool 151. Spool 152 and small diameter piston 151a have opposing surfaces upon which a pressure through the line P₅ is applied.

The compensation valve 150 has spool 151 having a piston face of large diameter piston 151b to which a vehicle speed responsive pressure (governor pressure $P_G$ or modulated pressure P₄₂) is applied (port e) and spool 152 to which the throttle pressure $P_{TH}$ responsive to the throttle opening is applied in accordance with the throttle opening. The spool 151 regulates the line pressure $P_L$ to provide an output signal pressure from the port d by closing or opening drain port X and the inlet port c. The regulated pressure urges the spool 151 against the vehicle speed responsive pressure $P_G$ to reach an equilibrium.

The equilibrium relation between acting forces on the spool 151 of the compensation valve 150 is represented by equation (1). An output pressure $P_C$ from the compensation valve 150 is represented by equation (2).

$$f + (A_1 - A_2) P_C + A_2 P_{TH} = A_1 P_G \qquad (1)$$

$$P_C = \frac{1}{A_1 - A_2} (A_1 P_G - A_2 P_{TH} - f) \qquad (2)$$

wherein representing:
f: biasing force of the spring 153
$A_1$: sectional area of piston 151b
$A_2$: sectional area of spool 152
and $P_G$: governor pressure in line P₄₂

In the present embodiment the line P₅ to kickdown valve 140 is deemed as being closed.

The kickdown valve 140 comprises a cylinder 141b and a spool 141 which is slidablly disposed within the cylinder 141b. The cylinder 141b has a drain port X₁, ports a and b, a drain port X₂, and an inlet port c. The spool 141 is biased by a spring 142 at one end adjacent to the drain port X₁ and has a diameter reduced portion 141a permitting communication between ports b and X₂ or between ports b and a. Throttle pressure $P_{TH}$ is applied to the other end 141c of the spool 141 via the port c and line P₅₀. Line pressure $P_L$ is applied to port a of the valve 140 from ports a and b of the manual select valve 130 via the line P₂.

The transmission ratio control servo 220 which is a follow-up type servo comprises an actuator 205 which is axially movable within a cylinder 204 (204a, 204b) bored in a body 203 and a spool 201 axially movable in the center bore 207 of the actuator 205 and in a small diametered bottom cylinder 204c as shown in FIG. 3 in detail. The spool 201 is biased toward the cylinder bottom by means of a compression spring 208.

The small diametered bottom cylinder 204c formed at the bottom of the recess 212 is provided with a port a at the bottom thereof. The signal pressure $P_L$ is applied to the port a from port d of the compensation valve 150 via the line P₆₀. The actuator 205 has spaced pistons 206a and 206b which are slidably disposed in cylinders 204a and 204b respectively. The actuator 205 is biased in toward the cylinder head by a spring 209 retained in a recess 212 of the cylinder 204b. The body 203 is provided with a port b at an area within which a second chamber CII is defined by pistons 206a and 206b. The port b is connected with the delivery port of the main pump 102 via the line $P_1$ so that the port b is subject to line pressure $P_L$. An arm 210 having a link hole 211 extends from the cylinder head end of the actuator 205. The arm 210 is linked with transmission ratio changing means (for example, spherical surface type transmission 104 as shown in FIG. 1) via link means (not shown) so that the forward and reverse movement of the actuator 205 between positions L and H causes the infinitely variable transmission 104 to be controlled.

The actuator 205 has a predetermined ratio of effective sectional areas with respect to pistons 206a and 206b. The actuator 205 has a port f communicated with the center bore 207 between pistons 206a and 206b, i.e., in the area of the second chamber CII and has a drain port X at the bottom of center bore 207.

The spool 201 comprises a hollow cylindrical portion 201a slidably adapted in the small diametered bottom cylinder 204c, a hollow cylindrical portion (spring receiving portion) 201b having an open end slidably adapted in actuator center bore 207, and an intermediate portion therebetween. At the intermediate portion 201c there are provided small passages 212a and 212b which extend in an axial direction. The small passage 212a communicates a port c with a port e. The small passage 212b communicates the hollow area of the spring receiving portion 201b with a port d of the intermediate portion. Ports e and f communicate when the spool 201 is biased rightwardly in FIG. 3. The port d is adapted to open when the spool 201 is retracted leftwardly or the actuator 205 is moved rightwardly. The port c is disposed in a spaced relationship with the port d so that the port c opens in the cylinder 204b housing the spring 209 as shown in FIG. 3 and the port c closes when the spool 201 has moved by predetermined length after the closing of port d.

The piston 206b has a pressure receiving sectional area (effective section) larger than that of the piston 206a. The actuator 205 moves to the cylinder bottom (left) against the biasing force of the spring 209 when a sufficiently high line pressure $P_L$ is applied to the second chamber CII via the port b. Such leftward movement of the actuator 205 causes the ports f and e to communicate and causes the pressurized fluid to flow into a first chamber CI via the passage 212a and port c. The equilibrium between pressures applied to the right and left sides of piston 206b is recovered by such fluid flow so that the actuator 205 is moved in an opposite direction (right) by the spring 209 to pass the original position and move further rightwardly. As the result, ports f and e will close and the port d will open. The pressurized fluid from the first chamber CI is discharged via port d to the small passage 212b, center bore 207 and drain port X. The pressure in the left cylinder chamber (first chamber CI) of the piston 206b is lowered again. The biasing force of spring 209 will become equal to the biasing force due to the difference between pressure receiving sectional areas (effective pressure receiving sectional area) of pistons 206b and 206a so that the actuator will not move rightwardly. Reciprocative motion between positions L and H of the link hole 211 of the actuator 205 is converted into changes in angle of roller shaft 107 of the transmission 104 by the link means (not shown). Simultaneous opening and closing of ports e and f with the closing and opening of the port d (zerolapping) will cause the most preferable precision of control.

In operation the manual select valve 130 is linked with a shift lever (not shown) through link means (not shown) to be manually actuated. In a neutral position N of the valve 130, the servo valve 220 (valve for changing forward and reverse movement) is in a position for forward movement due to the biasing force of the spring 222 since the line $P_1$ is closed by the manual valve 130.

Figure 6:
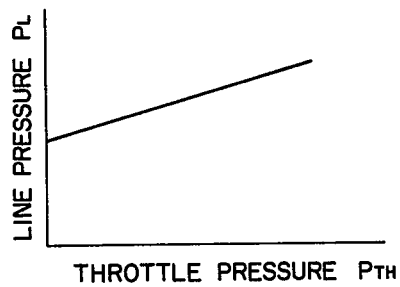
FIG. 6 is a graph showing the relation between throttle pressure $P_{TH}$ and line pressure $P_L$ (output pressure) in pressure regulating valve.

When the engine E is started, the main pump 102 begins to rotate establishing a line pressure $P_L$ in the line $P_1$. The main pump 102 will increase the delivery rate in proportion to r.p.m ($N_E$) of the engine, and produce the line pressure $P_L$ regulated by the pressure regulating valve 120. The line pressure $P_L$ is also regulated in response to the displacement of the accelerator pedal (throttle opening) by the application of the throttle pressure $P_{TH}$ corresponding to the throttle opening upon the pressure regulating valve 120. The relationship between the line pressure $P_{TH}$ and the throttle opening is shown in FIG. 6. The line pressure $P_L$ is applied to the port b of the transmission ratio control servo (RCS) 200 via the line $P_1$. Although the throttle is opened by depressing of the accelerator pedal at the start of the engine, the compensation valve 150 establishes no output signal pressure in the line $P_{60}$ since the line $P_2$ as a pressure source of the throttle valve 160 is not pressurized in the neutral position N of the manual select valve 130 and, the throttle pressure $P_{TH}$ is zero. Accordingly, the spool 201 is biased leftward by means of the spring 208 to abut the bottom end of the small diametered bottom cylinder 204c. Under such condition, the piston 206b of the actuator 205 of RCS servo 200 is acted upon by the line pressure $P_L$ from the port b so that it is retracted to the left position L (L position of the transmission gear ratio e) in FIG. 3 and stops after abutment with a stepped portion 204L of the left cylinder 204b. At this instant, the ports f and e open to communicate with each other. Hydraulic fluid will flow into the left (first) chamber CI via the small path 212a and port c, so that the fluid pressure in first chamber CI become equal to the pressure $P_L$. As a result, the resultant force arising from the biasing force of the spring 209 and the force applied upon the piston 206b by fluid in first chamber CI in an H direction exceeds the force in an L direction to urge the actuator 205 in an H direction. Such movement in the H direction results in a rapid drop in pressure in the left cylinder 204b since the port d opens to communicate with the drain X. Original pressure relation (low pressure in the first chamber CI) is established. Although the actuator 205 will move to the ultimate left it is blocked by the stepped portion 204L to stop at the position L defining a minimum transmission (gear) ratio e.

The line pressure $P_L$ is, on the other hand, applied upon the governor valve 170 via the line $P_1$. The vehicle speed responsive pressure (governor pressure) $P_G$ may be established immediately after the output shaft 110 has begun to rotate. The relation between the governor pressure $P_G$ and vehicle speed V is shown in FIG. 7.

Figure 5A:
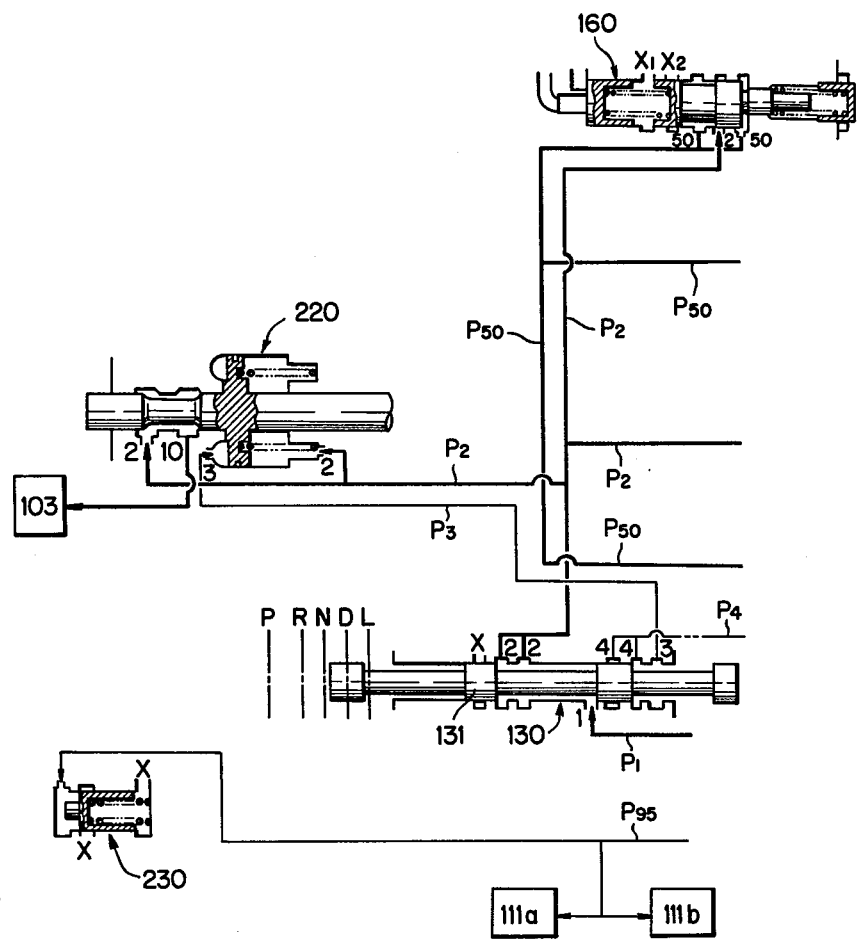
FIGS. 5 (5A,5B) is a hydraulic circuitry diagram similar to that of FIG. 2 showing the embodiment of the present invention when the manual select valve is in drive position D.
Figure 5B:
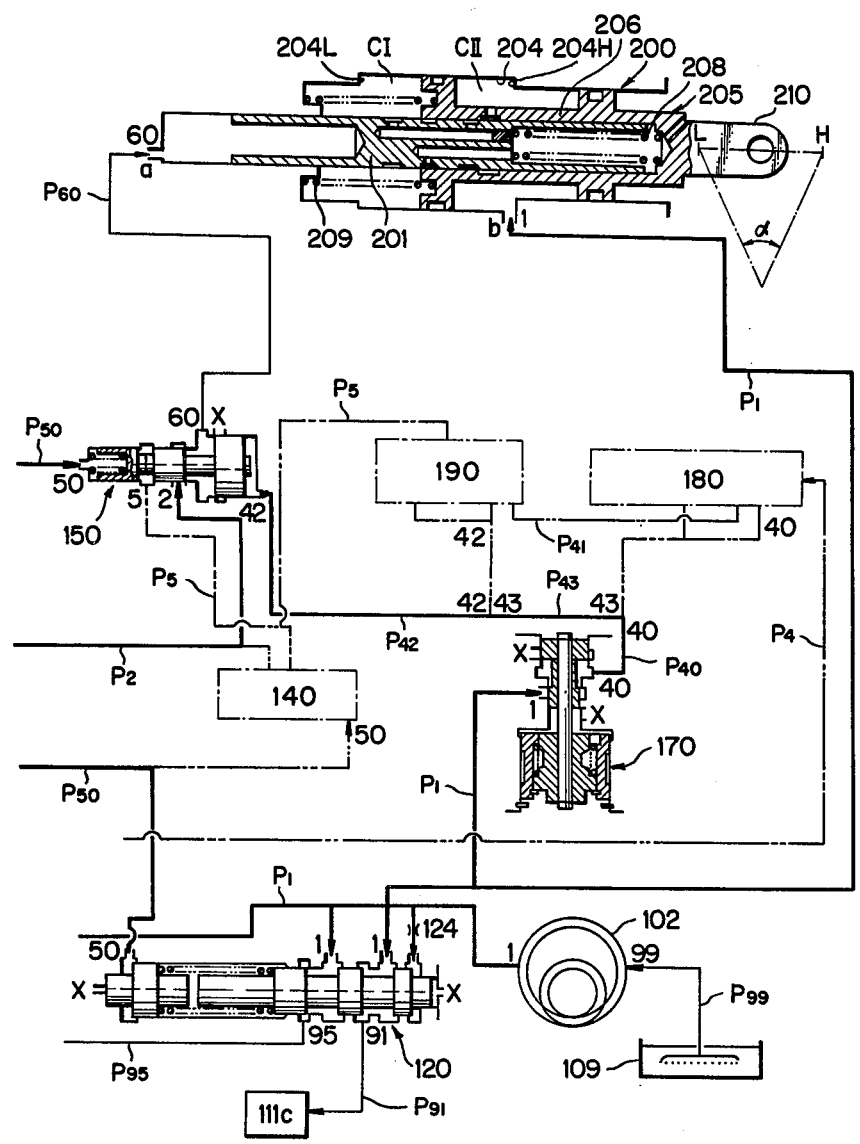

When the manual select valve 130 is shifted from position N to drive position D, the line $P_1$ is communicated with the line $P_2$ so that the line pressure $P_L$ is applied to the line $P_2$ (FIG. 5). As a result, the servo valve 220 is held in a forward position and the clutch 103 is rendered into engagement via the ports a and b and line $P_{10}$. Torque of the engine E is transmitted to the output shaft 110 from the engine output shaft 101 via the transmission 104, the forward and reverse change gear 108 so that the governor valve 170 rotates to establish a governor pressure $P_G$ responsive to the vehicle speed V. Simultaneously the line pressure $P_L$ is applied to the port b of the throttle valve 160 via the line $P_2$ since the port c of the manual select valve 130 is in communication with ports a and b. The opening of the passage between ports a and b of the throttle valve 160 increases in accordance with the depression of the accelerator pedal to establish a throttle pressure $P_{TH}$ in the line $P_{50}$. By the pressure establishment in the line $P_{50}$, the throttle pressure $P_{TH}$ is introduced into the port a of the compensation valve 150, the line pressure $P_L$ is introduced into the port c of the valve 150 via the line $P_2$ and the pressure $P_G$ from the governor valve 170 or corresponding pressure is introduced to the port e of the compensation valve 150 via the lines $P_{40}$, $P_{41}$ and $P_{42}$ (governor pressure $P_G$ is introduced directly via line $P_{43}$). As the result, the throttle pressure $P_{TH}$ (responsive to the throttle opening) is applied upon one end of the spool 151 of the compensation valve 150 and the governor pressure $P_G$ (responsive to vehicle speed) is applied upon another end of the spool 151 so that they counteract each other. The spool 151 slides leftwardly or rightwardly in accordance with the difference between the counteracting pressures $P_{TH}$ and $P_G$. The spool 151 communicates the port c (line $P_2$) with the port d (line $P_{60}$) when the pressure $P_G$ is higher than the pressure $P_{TH}$ or communicates the port d with the drain X at a reverse pressure relation.

At the start of the vehicle (vehicle speed v=0), the throttle pressure $P_{TH}$ is assummed to slightly increase. At this moment the spool 151 of the compensation valve 150 is in the right end of the cylinder. Line pressure $P_{60}$ is zero due to communication between the ports d and x. The RCS actuator 205 begins to start from the position L. After the vehicle has begun to move at a slight speed, the governor pressure $P_G$ which increases correspondingly is applied to the port e of the compensation valve 150.

When the throttle opening is increased and the pressure $P_{TH}$ assumes a substantially constant level, leftward movement of the spool 151 causes the drain port x to close. Simultaneously the port c is slightly opened (ports c and x will not open simultaneously, i.e., nonlapping) so that the line pressure $P_L$ is introduced to the port a of RCS servo 200 via the line $P_2$, ports c, d and line $P_{60}$ dependently upon the vehicle speed V. Accordingly the spool 201 slightly moves rightward (in the H direction) against the spring 208. At this moment the ports f and e of RCS servo 200 communicate with each other and the line pressure $P_L$ which is higher than that at the vehicle start is introduced to the left chamber CI to slightly bias the actuator 205 in the H direction. Thereafter the ports d and x are brought into communication to stop the H direction movement.

Similar operation is repeated with the increase in vehicle speed V when the vehicle speed is accelerated under a given opening of the throttle. The piston 206b of the actuator 205 will abut the a step 204H of the cylinder 204b, which is the position H determining a maximum transmission ratio. The vehicle speed peaks in this position H. Infinitely transmission ratio control (increase in transmission ratio e) is accomplished similarly to operation from start to acceleration when the acceleration pedal is depressed for vehicle acceleration.

If the acceleration pedal is released while the vehicle is running at a constant speed, throttle pressure in the line $P_{50}$ rapidly drop, and on the other hand the governor pressure $P_G$ gradually decreases due inertial coasting of the vehicle.

Under this condition, the spool 151 of compensation valve 150 is rapidly moved towards the port a to open the port c and the line pressure $P_L$ works on the piston 151b to open drain port x so that the line pressure $P_C$ in the line $P_{60}$ is rapidly decreased. The pressure in the small diametered bottom cylinder 204C of RCS servo 200 is rapidly decreased with the decreased pressure $P_C$ via the line $P_{60}$ and the port a so that spool 201 is moved leftward (in L direction) by force of compression spring 208. The pressure in the left chamber CI of RCS servo 200 is decreased by communication between the ports d and X so that the actuator 205 moves in the direction L again to close the port d and stops. Gradual decrease in the pressure $P_G$ causes the piston 151b to move rightward and the drain X of the compensation valve 150 to open again so that the pressure $P_L$ is further lowered. Thereafter the transmission ratio is gradually decreased by the L direction retraction of the RCS spool 201 and the subsequent retraction of the actuator 205.

On deceleration (by brake etc.) for stop, the pressure $P_{TH}$ is nearly zero and $P_G$ decreases in accordance with a decreasing vehicle speed V. In this case operation of the actuator 205 is similar to that in deceleration at during inertial coasting. The travel of the actuator 205 in the L direction is increased due to rapid decrease in pressure $P_G$.

Figure 8:
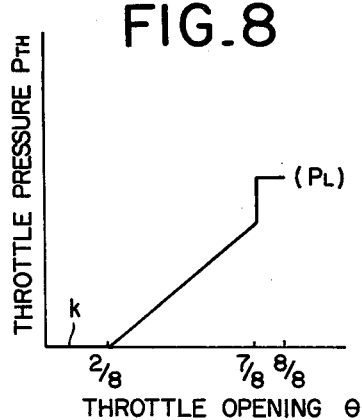
FIG. 8 is a graph showing the relation between the throttle opening of the throttle valve and the throttle pressure $P_{TH}$.

The clearance $d_2$ between the spools 161 and 162 of the throttle valve 160 is provided for rapidly increasing the throttle pressure $P_{TH}$ in response to throttle opening of 7/8 to 8/8 when the acceleration pedal is strongly depressed. The closing of clearance $d_2$ causes the spool 161 to be subject to the direct biasing force of the arm 165 without transmission via the spring 163, and the passage between ports a and b fully opens until the throttle pressure $P_{TH}$ becomes equal to $P_L$. The relationship therebetween is shown in FIG. 8. The area K where the throttle pressure $P_{TH}$ is zero along a throttle opening (0–2/8) corresponds to plays of throttle, acceleration pedal, and link means.

In the reverse position R of the manual select valve 130, the line pressure $P_L$ is introduced to the line $P_3$ due to communication between the ports c and f of the valve 130. The servo valve 220 is brought into the reverse (right) position to cause the forward and reverse change gear 108 to transfer to reverse position via the fork shaft 223. The ports c and b brought into communication engage the clutch 103.

On the other hand, the governor pressure $P_G$ is applied to the port e of the compensation valve 150 via the line $P_1$, governor valve 170, lines $P_{40}$, $P_{43}$ and $P_{42}$. The line $P_2$ is not pressurized and the throttle pressure is not established in the line $P_{60}$ although the throttle is open. Accordingly, the spool 151 of the compensation valve 150 is slightly moved leftward along with the increase in reverse vehicle speed V. The port c is brought into communication with the port d so that the line $P_{60}$ is brought into communication with the line $P_2$. No pressure is established in the line $P_2$ since the line $P_2$ is communicated with the drain port X of the manual select valve 130. The spool 201 of RCS servo 200 is retracted to position L at the left end of RCS servo 200 since no pressure is established in the line $P_{60}$. Thus transmission ratio e is fixed to a minimum value L at the reverse position R of the manual select valve 130.

When the manual select valve 130 is in the parking position P, the port f is closed so that the line $P_{10}$ is not applied with a pressure such that the clutch 103 is disengaged. The line pressure $P_L$ is applied to RCS servo 200. The line $P_{60}$ is not pressurized since the line $P_2$ is not pressurized. The actuator of RCS is actuator 205 of RCS servo 200 is in position L.

An embodiment of the system for controlling an indefinitely variable transmission of the present invention has been described in detail.

In the system for controlling the transmission ratio of infinitely variable transmission of the present invention, the spool for the actuator of transmission ratio control servo (RCS) is actuated against the spring force in accordance with the signal pressure established by the equilibrium between pressures responsive to the vehicle speed and throttle opening. The system of the present invention realizes infinitely the control of the transmission ratio e between positions L and H over a full range of the throttle opening and vehicle speed and has an appropriate response to sudden or gradual changes in the throttle opening and vehicle speed.

In the present invention a follow-up type actuator other than that shown in the embodiment may be used as a transmission ratio control valve RCS provided that such would render a similar function without departing from the gist of the present invention. Furthermore, the system of the present invention is adapted to fluidly-operated transmission as well as mechanically-operated transmission. In the system of the present invention the governor pressure is optionally regulated or controlled by additional means of hold valve or modulator valve.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for controlling a transmission ratio of an infinitely variable transmission for automatic vehicles including means for producing a line pressure, means for producing a pressure responsive to throttle opening, means for producing a pressure responsive to vehicle speed and means for changing said transmission ratio of said infinitely variable transmission, comprising:
   compensation valve means for producing a transmission ratio control pressure, wherein said compensation valve means for producing said transmission ratio control pressure further comprises a spool regulated by said throttle opening responsive pressure and said vehicle speed responsive pressure such that said transmission ratio control pressure increases when said vehicle speed responsive pressure is greater than said throttle opening responsive pressure and said transmission ratio control pressure decreases when said throttle opening responsive pressure is greater than said vehicle speed responsive pressure; and
   a servo valve wherein said servo valve further comprises a cylinder; a spring-backed spool to which said transmission ratio control pressure is applied against a spring force; and an actuator axially slidable in said cylinder, said actuator being operatively connected with said means for changing said transmission ratio and actuated by said line pressure and wherein said spring-backed spool further comprises control valve means for controlling said line pressure actuating said actuator such that said actuator slides in said cylinder so as to alternately cause a stepless increase and decrease in said transmission ratio in response to said transmission ratio control pressure applied to said spring-backed spool.

2. The system as defined in claim 1 wherein said control valve means for controlling said line pressure actuating said actuator further comprises means for applying a counteracting force against said actuator when said actuator is slidably displaced in response to an increase or a decrease in said transmission ratio control pressure.

3. The system as defined in claim 1 further comprising a second cylinder and wherein said spool of said compensation valve means for producing said transmission ratio control pressure is slidably disposed in said second cylinder, a first end of said spool is acted upon by said vehicle speed responsive pressure while simultaneously a second end of said spool is acted upon by said throttle opening responsive pressure such that said line pressure is converted into said transmission ratio control pressure.

4. The system as defined in claim 3 wherein said second cylinder of said compensation valve means for producing said transmission ratio control pressure includes a line pressure inlet port, a transmission ratio control pressure outlet port and a drain port formed therein, wherein a first communication passage is defined by said spool, said line pressure inlet port and said transmission ratio control pressure outlet port; and a second communication passage is defined by said spool, said transmission ratio control pressure outlet port and said drain port such that said line pressure regulated in said first and said second communication passages is alternately counteractingly applied to said spool against said vehicle speed responsive pressure.

5. The system as defined in claim 4 wherein said second cylinder of said compensation valve means for producing said transmission ratio control pressure includes a passage defined by a first and a second piston of said spool, said passage alternately communicating said transmission ratio control pressure outlet port to said line pressure inlet port and said transmission ratio control pressure outlet port to said drain port due to the sliding motion of said spool such that a land of said first piston regulates said line pressure inlet port and a land of said second piston regulates said drain port and said vehicle speed responsive pressure is applied to a first face of said second piston to regulate said line pressure applied to a second face of said second piston.

6. The system as defined in claim 1 wherein said servo valve further comprises a small diametered bottom cylinder and said actuator further comprises first and second servo pistons of different effective areas; said first servo piston, said spring-backed spool and said cylinder of said servo valve defining a first chamber and said first servo piston, said second servo piston and said cylinder of said servo valve defining a second chamber; said actuator including a center bore formed therein having slidably disposed therein said spring-backed spool; said actuator having a servo drain port disposed in said center bore; and said spring-backed spool being coaxially slidable in said small diametered bottom cylinder to define a center bottom chamber for receiving said transmission ratio control pressure such that said transmission ratio control pressure in said center bottom chamber regulates a first pressure and a second pressure in said first and said second chambers respectively by alternating communicating said first chamber with said second chamber and said second chamber with said servo drain port and said first and said second pressures act on said first and said second servo pistons to balance the position of said actuator.

7. The system as defined in claim 6 wherein said spring-backed spool includes a first passage intercommunicating said first and said second chambers, a drain passage intercommunicating said first chamber with said servo drain port and further comprising a spring disposed within said center bore for biasing said spring-backed spool against said transmission ratio control pressure in said center bottom chamber.

8. The system as defined in claim 6 or 7 wherein said spring-backed spool further comprises means for causing relative sliding of said spring-backed spool with respect to said actuator in response to changes in said tranmission ratio control pressure such that said actuator alternately follows the movement of said spring-backed spool due to communication and interruption between said first and said second chambers and between said first chamber and said servo drain port until said actuator is balanced.

9. The system as defined in claim 8 wherein said servo valve further comprises means for biasing said actuator such that said means for biasing said actuator counteracts said line pressure acting on said first servo piston.

10. The system as defined in claim 9 wherein said spring-backed spool further comprises means for urging said actuator such that said transmission ratio increases in response to an increase in said transmission ratio control pressure.

11. The system as defined in claim 9 wherein said first servo piston of said actuator has a larger effective area than said second servo piston and said first servo piston is slidably displaced within said cylinder of said servo valve for movement within a predetermined range.

12. The system as defined in claim 6 wherein said second pressure in said second chamber further comprises said line pressure.

13. The system as defined in claim 4 wherein said spool of said compensation valve means for producing said transmission ratio control pressure further comprises means for opening said drain port when said throttle opening responsive pressure is greater than said vehicle speed responsive pressure.

14. The system as defined in claim 5 wherein said first piston further comprises a first land for regulating said line pressure inlet port and said second piston further comprises a second land for regulating said drain port and said second land has a cross-section greater than said first land.

15. A system for controlling a transmission ratio of an infinitely variable transmission for automatic vehicles including means for producing a line pressure, means for producing a pressure responsive to throttle opening, means for producing a pressure responsive to vehicle speed and means for changing said transmission ratio of said infinitely variable transmission, comprising:

means for producing a transmission ratio control pressure responsive to throttle opening and vehicle speed; and a servo valve wherein said servo valve further comprises a cylinder; a spring-backed spool to which said transmission ratio control pressure is applied against a spring force; and an actuator axially slidable in said cylinder, said actuator being operatively connected with said means for changing said transmission ratio and actuated by said line pressure and wherein said spring-backed spool further comprises control valve means for controlling said line pressure actuating said actuator such that said actuator slides in said cylinder so as to alternately cause a stepless increase and decrease in said transmission ratio in response to said transmission ratio control pressure applied to said spring-backed spool.

16. A system for controlling a transmission ratio of an infinitely variable transmission for automatic vehicles including means for producing a line pressure, means for producing a pressure responsive to throttle opening, means for producing a pressure responsive to vehicle speed and means for changing said transmission ratio of said infinitely variable transmission, comprising:

means for producing a transmission ratio control pressure responsive to throttle opening and vehicle speed; and a servo valve wherein said servo valve further comprises a cylinder; a spring-backed spool to which said transmission ratio control pressure is applied against a spring force; a small diametered bottom cylinder; and an actuator axially slidable in said cylinder, said actuator further comprises a first and a second servo piston of different effective areas; said first servo piston, said spring-backed spool and said cylinder of said servo valve defining a first chamber and said first servo piston, said second servo piston and said cylinder of said servo valve defining a second chamber; said actuator including a center bore formed therein having slidably disposed therein said spring-backed spool; said actuator having a servo drain port disposed in said center bore; and said spring-backed spool being coaxially slidable in said small diametered bottom cylinder to define a center bottom chamber for receiving transmission ratio control pressure such that said transmission ratio control pressure in said center bottom chamber regulates a first pressure and a second pressure in said first and said second chambers respectively by alternately communicating said first chamber with said second chamber and said second chamber with said servo drain port and said first and said second pressures act on said first and said second servo pistons to balance the position of said actuator.

17. A system for controlling a transmission ratio of an infinitely variable transmission for automatic vehicles including means for producing a line pressure, means for producing a pressure responsive to throttle opening, means for producing a pressure responsive to vehicle speed and means for changing said transmission ratio of said infinitely variable transmission, comprising:

means for producing a transmission ratio control pressure responsive to throttle opening and vehicle speed; and a servo valve wherein said servo valve further comprises a cylinder; a spring-backed spool to which said transmission ratio control pressure is applied against a spring force; and an actuator axially slidable in said cylinder, said actuator being operatively connected with said means for changing said transmission ratio and actuated by said line pressure and wherein said spring-backed spool further comprises means for urging said actuator such that said transmision ratio steplessly increases in response to an increase in said tranmission ratio control pressure.

18. A system for controlling a transmission ratio of an infinitely variable transmission for automatic vehicles including means for producing a line pressure, means for producing a pressure responsive to throttle opening, means for producing a pressure responsive to vehicle speed and means for changing said transmission ratio of said infinitely variable transmission, comprising:

means for producing a transmission ratio control pressure responsive to throttle opening and vehicle speed; and a servo valve wherein said servo valve further comprises a cylinder; a spring-backed spool to which said transmission ratio control pressure is applied against a spring force; and an actuator axially slidable in said cylinder, said actuator having a first servo piston and a second servo piston, said first servo piston having a larger effective area than said second servo piston and said first servo piston being slidably displaced within said cylinder of said servo valve for movement within a predetermined range, said actuator being operatively connected with said means for changing said transmission ratio and actuated by said line pressure and wherein said spring-backed spool further comprises control valve means for controlling said line pressure actuating said actuator such that said actuator slides in said cylinder so as to alternately cause a stepless increase and decrease in said transmission ratio in response to said transmission ratio control pressure applied to said spring-backed spool.

* * * * *